United States Patent

Grunewalder et al.

[15] 3,697,618

[45] Oct. 10, 1972

[54] PRESSURE-SENSITIVE ADHESIVE

[72] Inventors: Valentine J. Grunewalder, Cranford; Earl A. Koeble, Martinsville, both of N.J.

[73] Assignee: National Starch and Chemical Corporation, New York, N.Y.

[22] Filed: Dec. 30, 1969

[21] Appl. No.: 889,292

Related U.S. Application Data

[63] Continuation-in-part of Ser. No. 623,569, March 16, 1967, abandoned.

[52] U.S. Cl.....260/78.5 R, 117/122 P, 117/138.8 A, 117/161 UT, 260/896, 260/897 R, 260/899, 260/901
[51] Int. Cl. ............................................. C08f 15/40
[58] Field of Search....260/78.5; 117/122 P, 122 PA, 117/138.8 A, 138.8 E, 161 UT

[56] References Cited

UNITED STATES PATENTS

| | | |
|---|---|---|
| 2,794,742 | 6/1957 | Fowler et al..............260/80.8 |
| 3,296,169 | 1/1967 | Corey.......................260/80.8 |
| 3,371,071 | 2/1968 | Brooks et al...............260/78.5 |
| 2,855,387 | 10/1958 | Barrett......................260/78.5 |

*Primary Examiner*—Joseph L. Schofer
*Assistant Examiner*—John Kight, III
*Attorney*—Chisholm and Spencer

[57] ABSTRACT

Acrylic pressure-sensitive adhesives consisting essentially of a normally tacky interpolymer of one or more alkyl acrylates of four to 14 carbon atoms in the alkyl group, at least one vinyl ester of a saturated monocarboxylic acid, and a small amount of alpha, beta-ethylenically unsaturated dicarboxylic acid or anhydride, the interpolymer having a Williams plasticity number between about 1.8 and about 3. These adhesives are especially adapted for use on flexible non-fibrous backings, particularly vinyl sheets and films, and when used in this manner have the advantage of preventing shrinking of the backing upon aging.

10 Claims, No Drawings

PRESSURE-SENSITIVE ADHESIVE

This application is a continuation-in-part of our copending application Ser. No. 623,569, filed Mar. 16, 1967, now abandoned.

Acrylic polymers containing solely or predominantly polymerized acrylic acid esters have become of increasing importance as pressure-sensitive adhesives. Certain adhesives of this type are described, for example, in Reissue Pat. No. 24,906 and U.S. Pat. Nos. 3,189,581 and 3,268,257. Adhesive tapes, wall coverings and the like employing such adhesives are attractive and durable, and are convenient and easy to apply.

As indicated, one important use for adhesives of this type is on flexible sheet material used as coverings for smooth surfaces such as walls and the like. In such applications, calendared vinyl sheet or other flexible sheet material is coated with the adhesive and the coated sheet is then interleaved with release paper in a roll and stored until it is to be applied to a wall or other surface. A serious problem arises with such coated materials, however, due to the dimensional instability of the common flexible sheet materials used. After application, or even during storage, the sheet tends to shrink, probably due to stresses introduced during coating or processing. As a result, gaps tend to arise after application, and it has consequently been considered necessary to employ overlap seams in applying these coated sheets, a practice which is esthetically and economically undesirable.

It is recognized that the adhesive employed could prevent such shrinkage if it had sufficient internal strength. However, ordinary pressure-sensitive adhesives do not possess sufficient strength and attempts to increase the strength of these adhesives, as by increasing their molecular weight, have resulted in adhesives with inferior tack and adhesive properties.

The present invention relates to improved acrylic pressure-sensitive adhesives having high tack and relatively high plasticity number, and which have both good adhesive properties and a high degree of "shrink resistance." By this it is meant that when these adhesives are coated on flexible backings the normal tendency of such coated backings to shrink upon aging as described above is greatly inhibited and generally prevented.

The adhesive compositions of the invention consist essentially of a normally tacky interpolymer of (A) at least one alkyl acrylate containing four to 14 carbon atoms in the alkyl group, (B) at least one vinyl ester of a saturated monocarboxylic acid having one to six carbon atoms, and (C) at least one copolymerizable alpha, betaethlenically unsaturated dicarboxylic acid or anhydride.

The alkyl acrylate component of the interpolymer provides the basic properties of tack and adhesion and an appreciable proportion of an interpolymer is made up of the alkyl acrylate component. The particular alkyl acrylate or mixture of alkyl acrylates utilized depends upon the degree of tack necessary and also the identity and amount of the other components of the interpolymer, but it is necessary that the acrylate provide a tacky polymer. Thus the alkyl acrylate or acrylates used should have from about four to about 14 carbon atoms in the alkyl group; the preferred alkyl acrylates contain eight carbon atoms in the alkyl group and particularly preferred is 2-ethylhexyl acrylate. Other acrylates that can be employed include, for example, butyl acrylate, hexyl acrylate, octyl acrylate, isooctyl acrylate, decyl acrylate and dodecyl acrylate.

The second component of the interpolymer is a vinyl ester of a saturated monocarboxylic acid having two to six carbon atoms. Vinyl acetate is the preferred monomer of this class, but others such as vinyl propionate, vinyl butyrate, and vinyl valerate can also be employed. The vinyl ester component helps provide an adhesive of suitable strength and cohesiveness, and aids in obtaining an interpolymer of the desired plasticity number. Also, the presence of the vinyl ester provides improved adhesion to many substrates and especially to the preferred vinyl sheet backing.

The third essential component of the interpolymer, and that which in large part provides the desired combination of properties, is the relatively small amount of copolymerizable alpha, beta-ethylenically unsaturated dicarboxylic acid or anhydride. Maleic anhydride is the specific preferred monomer of this class, although maleic acid, itaconic acid and itaconic anhydride also provide desirable results. Mixtures can be used if desired. Fumaric acid is not ordinarily employed because its limited solubility in common organic solvents makes it difficult to copolymerize with the other components. Generally speaking, the dicarboxylic acid or anhydride contains four to 12 carbon atoms.

The proportions of the monomers in the interpolymer can be varied, but it is important to have each of the components present in the amount necessary to provide the properties described above. Usually from about 20 percent to about 60 percent by weight, based on the total weight of the interpolymer, is made up of the vinyl ester component and from about 0.3 percent to about 5 percent by weight, on the same basis, is comprised of unsaturated dicarboxylic acid or anhydride. At least about 35 percent by weight, and in most cases, the remainder of the interpolymer, is made up of the alkyl acrylate or acrylates. A preferred class of interpolymers contains from about 25 to about 45 percent by weight of vinyl ester and from about 0.5 to about 3 percent by weight of unsaturated dicarboxylic acid or anhydride, with the remainder being alkyl acrylate.

As indicated above, the plasticity number of the interpolymer is an important consideration in determining its suitability for the present adhesives. The interpolymer should have a Williams plasticity number between about 1.8 and about 3. At plasticity numbers below about 1.8, the interpolymer does not ordinarily have the desired properties, particularly those relating to shrink resistance, and if the plasticity number of the interpolymer is much above 3 its adhesive properties are generally deficient without the aid of additional tackifier. The preferred adhesives of the invention employ interpolymers having plasticity numbers between about 2.2 and about 2.7.

The Williams plasticity numbers employed herein are related to the molecular weight and composition of the polymer and are measured using a 2-gram spherical sample of the dried resin which is placed between two parallel plates with a 5,000 gram flat weight on the top plate. The Williams plasticity number is defined as the height in millimeters of the sample after being compressed in this manner for 14 minutes at 100° F.

The interpolymers employed herein are ordinarily made by free-radical initiated polymerization in organic solvent solution. One advantage of the present adhesives is the fact that the desired properties can be attained in a solution-polymerized interpolymer, which for many adhesive coating applications is more desirable and which gives better application properties in many coating operations. The preferred solvents are esters such as ethyl acetate, isopropyl acetate, butyl acetate, etc., although aromatic hydrocarbons and naphthas can be employed. A preferred solvent is isopropyl acetate containing a small amount, e.g., 5 percent or less, of isopropanol.

The polymerization procedure can be essentially any conventional procedure for polymerizing the type of monomers employed, using a free-radical catalyst such as benzoyl peroxide, cumene hydroperoxide, tertiary-butyl peroxy isopropyl carbonate, azo-bis(isobutyronitrile), or the like. It has been found, however, that in order to attain interpolymers of the preferred plasticity number it is highly desirable to carry out the copolymerization using initially a portion of the monomers containing a larger relative proportion of the vinyl ester and then adding the remainder of the monomers slowly after polymerization has begun. It is also desirable to add the catalyst incrementally during the reaction.

The adhesive composition may include other materials with the interpolymer described above, such as tackifying resins. The preferred tackifying resins are pressure-sensitive polymers of alkyl acrylates, such as polymers of butyl acrylate, hexyl acrylate and 2-ethyl-hexyl acrylate, and polymers of similar alkyl acrylates. In addition to homopolymers of such esters, copolymers of acrylates with monomers as vinyl acetate are also desirable tackifying resins.

While acrylate polymers are the most desirable, other added tackifying resins that can be used include rosin and rosin derivatives, such as the glycerol ester of hydrogenated rosin (Staybelite Ester-10), the methyl ester of hydrogenated rosin, and the like; polyterpenes, such as polymerized beta-pinene (e.g., Piccolyte S-115, which has a softening point of 115° C.); hydrocarbon resins, such as polycyclopentadiene and polymerized petroleum fractions (e.g., Piccopale 100, which is a polymer of aliphatic and alicyclic hydrocarbons having a softening point of 100° C.); chlorinated biphenyl resins, such as chlorinated polyphenyl and chlorinated biphenyl; terpene-phenolic resins, such as the reaction product of rosin and phenol having a melting point of 270° F. and an acid number of about 65 (SP-560 Resin); coumarone-indene resins, such as the resinous product of polymerized coal tar light oils (e.g., Nevillac Hard, which has a softening point of 70° C. to 80° C.); and polystyrenes, such as polymerized alpha-methyl styrene. The preferred tackifiers are polyvinyl ethers. When a tackifying resin is employed in the composition, it is generally present in an amount between about 30 and about 300 parts by weight.

As described above, the adhesives of the invention are highly desirable for use on flexible non-fibrous backings and particularly vinyl sheet material. Such vinyl sheet material ordinarily comprises a vinyl halide polymer, that is, a homopolymer of vinyl chloride or other vinyl halide, or a copolymer of such vinyl halide containing a small amount of vinyl alcohol units or a comonomer such as vinylidene chloride, acrylonitrile, vinyl acetate, or the like. Other flexible non-fibrous backings to which the adhesives of the invention are applicable include such materials as polyethylene, polyethylene terephthalate, polyvinylidene chloride, and similar materials.

While these adhesives are especially useful with flexible non-fibrous backings such as those described above, they can also be used with fibrous materials, such as cotton or other cloth, paper and similar materials. If desired, they can also be used on non-flexible backings, including such materials as wood, hardboard, metals, polystyrene and other plastics, and the like.

The adhesive can be applied to the backing in essentially any conventional manner, for example, brushing, spraying, gravure roll, etc., but in the preferred application in which the adhesive is coated onto a flexible sheet they are preferably roll-coated onto the flexible backing member. It may be noted that the advantages of the adhesives herein are particularly adapted to coatings applied by roll coating, since in roll coating additional stresses and strain may be imparted to the flexible sheet material resulting in increased dimensional instability, which is ordinarily manifested by the shrinkage as described above.

Set forth below are several examples of the invention and the manner in which the adhesives are prepared and utilized. These examples are given for purposes of illustration and should not be construed as limiting the invention to their details. All parts and percentages in the examples are based on non-volatile resin solids and are by weight, unless otherwise indicated.

EXAMPLE 1

A mixture of 346 parts of 2-ethylhexyl acrylate, 460 parts of vinyl acetate and 10.5 parts of maleic anhydride was mixed with 665 parts of isopropyl acetate (containing 3.0 to 3.7 percent of isopropanol) and 2.57 parts of benzoyl peroxide. This mixture was heated to 85° C. and after a short induction period polymerization began. While maintaining reflux there was added over a period of 90 minutes a second solution which consisted of 1,018 parts of 2-ethylhexyl acrylate, 452 parts of vinyl acetate, 1,806 parts of isopropyl acetate (as above), 19 parts of maleic anhydride and 11.7 parts of benzoyl peroxide. Reflux was continued for 6 hours after the addition was complete, with the addition of 4 parts of benzoyl peroxide in 40 parts of isopropyl acetate after each of the first and second hours and the addition of 1.9 parts of benzoyl peroxide in 40 parts of isopropyl acetate after 3½ hours. At the end of 6 hours, sufficient isopropanol was added to make the resin solids content about 30 percent. The product obtained had the following properties:

| | |
|---|---|
| Viscosity | 300 centipoises |
| Non-volatile solids content | 29.2 percent |
| Williams plasticity number | 2.43, 2.52 |

The adhesive was coated on calendared polyvinyl chloride film containing 5 percent polymeric epoxy plasticizer. The vinyl film was 3.5 mils thick and the coated film was baked for 3 minutes at 275° F. to give a dry adhesive coating of 0.008 to 0.010 grams per square inch. The coated film was tested as follows:

Tack (Rolling Ball). A section of the adhesive coated vinyl film 3 inches by 15 inches is placed upon a flat surface with the adhesive side facing up. A 2-gram stainless steel ball is rolled onto the adhesive film from a 5-inch long V-shaped channel inclined at a 20° angle and brought to the horizontal through a 1-inch section. The distance the ball travels over the film before stopping is a measure of the tack, with the shorter the distance the greater the tack.

Instron Peel Strength. A 1-inch by 6-inch strip of the adhesive coated film is applied to a 2-inch by 5-inch stainless steel panel. After aging for 20 minutes, the sample is peeled from the stainless steel panel using an Instron Tester, at a peel rate of 12 inches per minute. The peel strength is recorded in grams per linear inch.

Shrinkage. A 4-inch by 4-inch square of the adhesive coated vinyl is mounted on a clean, dry Formic panel. Glass or varnished wood can be substituted for the Formica. The edge of the vinyl film is marked with a wax pencil with the markings extending onto the substrate. The panel is then maintained at 110° F. for 10 days and examined daily to note any distance between the edge of the film and the original edge. Any shrinkage is recorded in mils.

The above adhesive, when tested in this manner had the following results:

| | |
|---|---|
| Tack | 3–5 inches |
| Instron peel strength | 941 grams per inch |
| Shrinkage | None |

As indicated, the adhesive obtained had excellent properties, including good shrinkage resistance as well as desirable adhesive properties.

EXAMPLE 2

Following the procedure of Example 1, an adhesive was made from the following monomers:

| | First Addition | Second Addition |
|---|---|---|
| | (Parts by Weight) | |
| 2-Ethylhexyl acrylate | 74 | 242 |
| Butyl acrylate | 74 | 242 |
| Vinyl acetate | 200 | 143 |
| Maleic anhydride | 4.5 | 8.3 |
| Isopropyl acetate (containing 3.0 to 3.7 percent isopropanol) | 284 | 772 |
| Benzoyl peroxide | 1.1 | 5.0 |

During the polymerization, three additions of 1.7 parts of benzoyl peroxide and 17 parts of isopropyl acetate were made. The product had the following properties:

| | |
|---|---|
| Total solids | 29.2 percent |
| Plasticity number | 1.90 |
| Viscosity | 350 centipoises |

The adhesive, when coated on vinyl film and tested as in Example 1, gave the following properties:

| | |
|---|---|
| Tack (Rolling Ball) | 1–2 inches |
| Instron peel strength | 879 grams per inch |
| Shrinkage | None |

EXAMPLE 3

A reaction vessel was charged with the following:

| | Parts by Weight |
|---|---|
| 2-Ethylhexyl acrylate | 142 |
| Vinyl acetate | 100 |
| Itaconic acid | 1.3 |
| Isopropyl acetate (containing 1.5 percent isopropanol) | 230 230 |
| Benzoyl peroxide | 0.75 |

This mixture was heated to reflux and then the following mixture was added over a period of 1 hour:

| | Parts by Weight |
|---|---|
| 2-Ethylhexyl acrylate | 273 |
| Vinyl acetate | 185.5 |
| Itaconic acid | 3.5 |
| Isopropyl acetate (1.5 percent isopropanol) | 445 |
| Benzoyl peroxide | 2.3 |

After this addition was complete, 138 additional parts of the isopropyl acetate were added and reflux was continued. After 90 minutes, 2.3 parts of benzoyl peroxide in 57.5 parts of the isopropyl acetate were added over a 1 hour period. Refluxing was again continued for 3½ additional hours with the addition of 1.2 parts of benzoyl peroxide in 12 parts of the isopropyl acetate being made after one hour and again after 2 hours. At the end of the reaction 700 parts of isopropyl acetate were added. The product had the following properties:

| | |
|---|---|
| Viscosity | 900 centipoises |
| Total solids content | 30.7 percent |
| Plasticity number | 2.76 |

When coated on vinyl film and tested as in the above examples, this product again had excellent properties, including no shrinkage.

In a similar manner, good results are obtained using other components as described above in place of those of the examples given. For instance, other dicarboxylic acids or anhydrides, such as maleic acid or itaconic anhydride, can be used in place of those exemplified, as can other vinyl esters, such as vinyl propionate, and other acrylate monomers, such as those mentioned above. Similarly, other polymerization procedures as indicated herein can be utilized, and the adhesive obtained can be coated on various substrates, including other flexible sheet materials as well as non-flexible and fibrous backing members.

According to the provisions of the patent statutes, there are described above the invention and what are now considered to be its best embodiments. However, within the scope of the appended claims, it is to be understood that the invention can be practiced otherwise than as specifically described.

What is claimed is:

1. A pressure-sensitive adhesive composition which is capable of preventing shrinkage of flexible non-fibrous backings when maintained at 110° F for 10 days, comprising a normally tacky interpolymer consisting essentially of
   A. at least one alkyl acrylate containing four to 14 carbon atoms in the alkyl group,
   B. from about 20 to about 60 percent by weight, based on total weight of the interpolymer, of at least one vinyl ester of a saturated monocarboxylic acid having two to six carbon atoms, and
   C. from about 0.3 to about 5 percent by weight, based on the total weight of interpolymer, of at least one copolymerizable alpha, betaethylenically unsaturated dicarboxylic acid or anhydride;

said interpolymer having a Williams plasticity number of between about 1.8 and about 3.

2. The adhesive of claim 1 in which component (C) is maleic anhydride.

3. The adhesive of claim 1 in which said vinyl ester is vinyl acetate.

4. The adhesive of claim 1 in which said alkyl acrylate contains eight carbon atoms in the alkyl group.

5. The adhesive of claim 1 in which said interpolymer consists essentially of
   A. at least one alkyl acrylate containing four to 14 carbon atoms in the alkyl group,
   B. from about 25 to about 45 percent by weight of vinyl acetate, and
   C. from about 0.5 to about 3 percent by weight of at least one member of the group consisting of maleic acid or anhydride.

6. The adhesive of claim 5 in which said alkyl acrylate is 2-ethylhexyl acrylate.

7. A normally tacky and pressure-sensitive adhesive coated article comprising a backing member and superimposed thereon a dried film of the adhesive composition of claim 1.

8. The article of claim 7 in which said backing member is flexible sheet material.

9. A normally tacky and pressure-sensitive adhesive coated article comprising a flexible, non-fibrous backing member and superimposed thereon a dried film of the adhesive composition of claim 5.

10. The article of claim 9 in which said backing member is vinyl halide polymer.

* * * * *